United States Patent
Baulier

(10) Patent No.: US 7,100,271 B2
(45) Date of Patent: Sep. 5, 2006

(54) AUTOMOTIVE VEHICLE FRAMING SYSTEM

(75) Inventor: Dominique Baulier, St. Clair Beach (CA)

(73) Assignee: Valiant Corporation, Windsor (CA)

( * ) Notice: Subject to any disclaimer, the term of this patent is extended or adjusted under 35 U.S.C. 154(b) by 254 days.

(21) Appl. No.: 10/668,525

(22) Filed: Sep. 23, 2003

(65) Prior Publication Data

US 2005/0060862 A1    Mar. 24, 2005

(51) Int. Cl.
*B23P 21/00* (2006.01)
*B23P 19/00* (2006.01)

(52) U.S. Cl. .............................. 29/711; 29/783; 29/787; 29/791; 29/795; 483/22; 483/27

(58) Field of Classification Search ................ 29/57, 29/565, 50, 771, 711, 783, 787, 791, 795; 483/22, 26, 27
See application file for complete search history.

(56) References Cited

U.S. PATENT DOCUMENTS

| | | | |
|---|---|---|---|
| 4,494,687 A | 1/1985 | Rossi | 228/47 |
| 4,667,866 A | 5/1987 | Tobita et al. | 228/4.1 |
| 4,946,089 A | 8/1990 | Baulier et al. | 228/45 |
| 5,011,068 A | 4/1991 | Stoutenburg et al. | 228/4.1 |
| 5,232,513 A | 8/1993 | Suratt et al. | 134/21 |
| 5,251,739 A | 10/1993 | Tolocko et al. | |
| 5,397,047 A | 3/1995 | Zampini | 228/6.1 |
| 5,419,352 A | 5/1995 | Johnson | 134/102.1 |
| 5,632,588 A * | 5/1997 | Crorey et al. | 198/468.2 |
| 5,902,496 A | 5/1999 | Alborante | 219/86.24 |
| 6,008,471 A | 12/1999 | Alborante | 219/158 |
| 6,065,200 A | 5/2000 | Negre | 29/430 |
| 6,074,329 A * | 6/2000 | Hirano et al. | 483/15 |
| 6,138,889 A | 10/2000 | Campani et al. | 228/4.1 |
| 6,364,817 B1 * | 4/2002 | McNamara et al. | 483/1 |
| 6,378,186 B1 | 4/2002 | Angel | 29/281.1 |
| 6,389,698 B1 | 5/2002 | Malatier | 29/897.2 |
| 6,438,842 B1 | 8/2002 | Raami | 29/897.2 |
| 6,493,930 B1 | 12/2002 | Raami | 29/783 |
| 2003/0037432 A1 | 2/2003 | McNamara | 29/771 |

FOREIGN PATENT DOCUMENTS

| | | |
|---|---|---|
| DE | 4418755 A1 | 11/1995 |
| EP | 0 147 530 | 9/1984 |
| EP | 0734941 A1 | 10/1996 |
| EP | 1 302 391 | 4/2003 |

(Continued)

*Primary Examiner*—Marc Jimenez
(74) *Attorney, Agent, or Firm*—Gifford, Krass, Groh, Sprinkle, Anderson & Citkowski, P.C.

(57) ABSTRACT

A vehicle framing system for framing an automotive vehicle body from a plurality of separate body components wherein the body components each include a reference surface. The system includes an assembly station having spaced-apart frame members positioned so that, when a vehicle carrier supporting the vehicle body components is positioned at the assembly station, the frame members extend along opposite sides of the vehicle carrier. At least two docking stations are secured to each frame member at predetermined locations. A robot mounts its associated tool arm with a docking station. At least one set of reference block and framing clamp is secured to each tool arm and these framing clamps maintain the reference surfaces of the vehicle body components against the reference blocks to hold the vehicle components at a predetermined position relative to each other. After each robot positions each associated tool arm with the docking station, the robot disengages from the tool arm and then welds the body components together by a welding gun carried by the robots.

16 Claims, 5 Drawing Sheets

FOREIGN PATENT DOCUMENTS

| | | |
|---|---|---|
| FR | 2 627 116 | 8/1990 |
| FR | 2 833 877 | 6/2003 |
| WO | 95/32886 | 12/1995 |
| WO | 01/26953 | 4/2001 |
| WO | 02/092278 | 11/2002 |

* cited by examiner

AUTOMOTIVE VEHICLE FRAMING SYSTEM

BACKGROUND OF THE INVENTION

I. Field of the Invention

The present invention relates to an automotive framing system, or any other geometry station, for accurately positioning vehicle body components relative to each other prior to securing the vehicle body components together.

II. Description of the Prior Art

In the manufacture of automotive vehicles, a conveyor system typically transports a body preassembly sequentially along a conveyor line. Such body preassemblies supported by a vehicle carrier comprise various body components, such as an underbody, front structure, body sides, headers, etc., which are loosely attached to each other in their approximate final assembly position relative to each other.

In order to fixedly secure the body components together, it is imperative that the body components be precisely positioned relative to each other to freeze their geometry by "tack welds" performed in this framing station, prior to a "respot" of the whole body in order to provide its final strength. To accomplish such precision positioning of the body components, there have been previously known automotive framing systems.

In one prior art automotive framing system, a gantry is positioned above the assembly station at a midpoint of the conveyor line. The gantry includes swing arms which are movable between a raised and a lowered position. In their raised position, the swing arms are positioned away from the body preassembly which enables the next preassembly to be moved by the conveyor system into the assembly station. Conversely, in their engaged position, the arms swing downwardly approaching "damp units" supporting reference blocks and clamps to engage predetermined reference surfaces or location points of the various vehicle body components, and clamp the body components together at a predetermined position relative to each other. With the body components clamped together, robotic welders or the like extend through openings in the reference frame and are used to fixedly secure the body components together by "tack welds".

In still a further type of previously known automotive framing system, a reference frame is positioned around the body preassembly when the preassembly is positioned at the assembly station. In this type of previously known automotive framing system, pivoting or sliding units connected to the reference frame and supporting reference blocks and clamps extend into the interior of the automotive vehicle body components to engage the reference surfaces of the body components, and lock the body components together at a predetermined position relative to each other prior to welding.

In still a further type of previously known automotive framing system, a side gate is positioned along each side of the assembly station. These side gates are movable between a retracted position, in which the gates are positioned laterally outside the assembly station to permit the body preassembly to be moved into the assembly station, and an assembly position in which the gates are positioned along each outer side of the body preassembly. Pivoting or siding units mounted onto the gates and supporting clamping assemblies then extend into the vehicle body components to secure the body components in the desired predetermined position relative to each other. Thereafter, robotic welders extend through openings in the gate, into the vehicle and "tack weld" the vehicle body components together.

All of these previously known automotive framing systems, however, suffer from a number of common disadvantages. First, the wide area covered by the same tool structure, i.e. the gate or swing arm, does not enable a common approaching trajectory for the tool structure in which all the reference blocks and clamp units will remain stationary on the tool structure, and the clamps of simple design. Further, to remain quasi-standard, the gates, frames, or swing arms supporting the pivoting or sliding units holding the reference blocks and clamping units will stay positioned remotely around the exterior of the body preassembly. Since the clamping surfaces on the body components are frequently contained within the interior of the body preassembly, these previously known framing systems necessarily required complex, articulated clamping assemblies which must extend into the interior of the body preassembly in order to clamp the body components at their desired position relative to each other. Such clamping assemblies are oftentimes necessarily articulated relative to their gate or reference frame. As such, these clamping assemblies are both expensive to manufacture and subject to wear after prolonged use. Such wear adversely affects the accuracy of the overall framing system.

A still further disadvantage of these previously known framing systems is that, after the body preassembly has been moved into the assembly station and clamped at the desired position relative to each other, it is necessary for robotic welders to then extend through openings in either the gate or the reference frame in order to weld the body components together. Due to interference between the robotic welders and either the gate or reference frame, the use of complex and time-consuming robot trajectories, and thus expensive robotic engineering study, has been required.

A still further disadvantage of these previously known framing systems is that it is necessary to use a different reference frame or a different gate even for slightly different vehicle body styles. Since multiple body styles are oftentimes assembled together at a single assembly station, it has been previously necessary to move either different reference frames or different gates to the assembly station in order to accommodate the different vehicle body styles. Since these previously known reference frames and gates are massive in construction and require a long design and fabrication time, they are expensive and may delay the time to put a new vehicle on the market. Furthermore, these systems require a large footprint on the shop floor to store the unused set of tools.

Recently, a new generation of framing system has been developed to take advantage of the low cost, mass-produced robots. All these framers try to reproduce the exact same tool change movement previously achieved with a dedicated piece of machinery, but by using a dedicated high load capacity robot. The tooling used corresponds to the previous gates or frames, but is more simply built with lighter structure, material and components. There is, of course, an initial saving achieved on the tool handing system, but because the tooling remains large and difficult to handle, the full agility of the robot cannot be exploited. Furthermore, the tooling still requires a lot of pivoting or sliding units to bring some movable reference blocks into contact with their working surface, thus increasing the complexity of the tooling, its weight, compliance, cost, reliability and cycle time.

SUMMARY OF THE PRESENT INVENTION

The present invention provides an automotive framing system for a vehicle body which overcomes all of the above-mentioned disadvantages of the previously known devices by splitting the traditional large tool frame in a set of elementary tool arms with which the robot can develop its full agility to set in position.

In brief, the vehicle framing system of the present invention comprises an assembly station having spaced-apart frame members. A vehicle carrier which supports the vehicle body components in a preassembled condition is then moved into the assembly station by a conventional conveyor.

Depending on the body carrier type, i.e. a skid or a geometry pallet, these spaced-apart frame members can be vertically movable but preferably stationary.

At least two docking stations are secured to each frame member at predetermined positions along the frame member. A tool arm is associated with each docking station and each tool arm includes at least one set of reference blocks or locating pins and its clamp designed to engage a reference surface on one of the vehicle body components to secure the vehicle body components at predetermined positions relative to each other.

A robot is associated with each tool arm and will preferably carry both its welding gun and its associated tool arm to avoid lost time in switching one for the other. The robot moves each tool arm between an assembly position and a vehicle loading position where other tool arms dedicated to other vehicle types are stored.

During the body loading operation, the proper tool arm is selected from a tool arm storage support 27 (FIG. 1) and engaged by the robot. As soon as the new loose-mounted body preassembly is positioned in the framing station, each robot manipulates its tool arm into the body frame thus bringing the stationary reference block into contact with the corresponding location surface. Once in the exact assembly position, each tool arm abuts against its associated docking station so that each tool arm is positioned at the assembly station at a predetermined position relative to the frame members at the assembly station. Then a tool arm clamp mounted on each docking station clamps the tool arm to its associated docking position at a predetermined position and a media quick coupling provides pressurized air and electric connections to energize the clamps or any other air cylinder or proximity switches.

Once the tool arms are secured to their associated docking stations, each robot disengages from its associated tool arm, while at the same time all the clamping sequence is achieved. Thereafter, a welder carried by at least one of the robots extends into the body vehicle preassembly in order to fixedly secure the body components together at their predetermined position relative to each other thus completing the body assembly.

After the body components are welded together, the clamps are released and each robot reengages with its associated tool arm. Thereafter, the tool arm clamps disengage thus releasing the tool arms from their associated docking stations. The robots then move the tool arms laterally outwardly to their vehicle loading position, and depending on the next vehicle to frame or a specific process, it may either keep the same tool arm or drop it to "respot" the current vehicle, or take a new tool arm matching the new vehicle type. Thereafter, the now assembled vehicle body assembly is moved by the conveyor out of the assembly station while a new vehicle carrier supporting a new body preassembly is moved into the assembly station and the above process is repeated.

A primary advantage of the framing system of the present invention is that the robots are able to manipulate the tool arms so that a portion of one or more of the tool arms extend into the body preassembly and closely adjacent the body component reference surfaces. As such, relatively inexpensive clamping assemblies carried by each tool arm are employed to not only rapidly, but also accurately, position the vehicle body components together in preparation for final assembly. Since relatively simple clamping assemblies are used to position the vehicle body components, inaccuracies caused by wear and/or design of the previously known articulated clamps are avoided and welding robot accessibility is maximized.

A still further advantage of the automotive framing system of the present invention is that different tool arms may be easily engaged and manipulated by the robots in order to accommodate different body styles. Furthermore, in case of robot interference or crash or other tool arm malfunction, only a simple fraction of the tooling will need to be fixed and geometrically recalibrated.

Since all of the robots installed are fully utilized in both the handling and welding processes, the extra cost and additional footprint and volume requirement next to the body to frame of the previous systems which used dedicated robots for handling is avoided.

The present invention allows up to four medium capacity welding robots per side for a pure floor-mounted configuration and, if necessary, four to six additional robots mounted on a balcony, reducing the overall cycle time for a given number of tack-welds to be performed.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
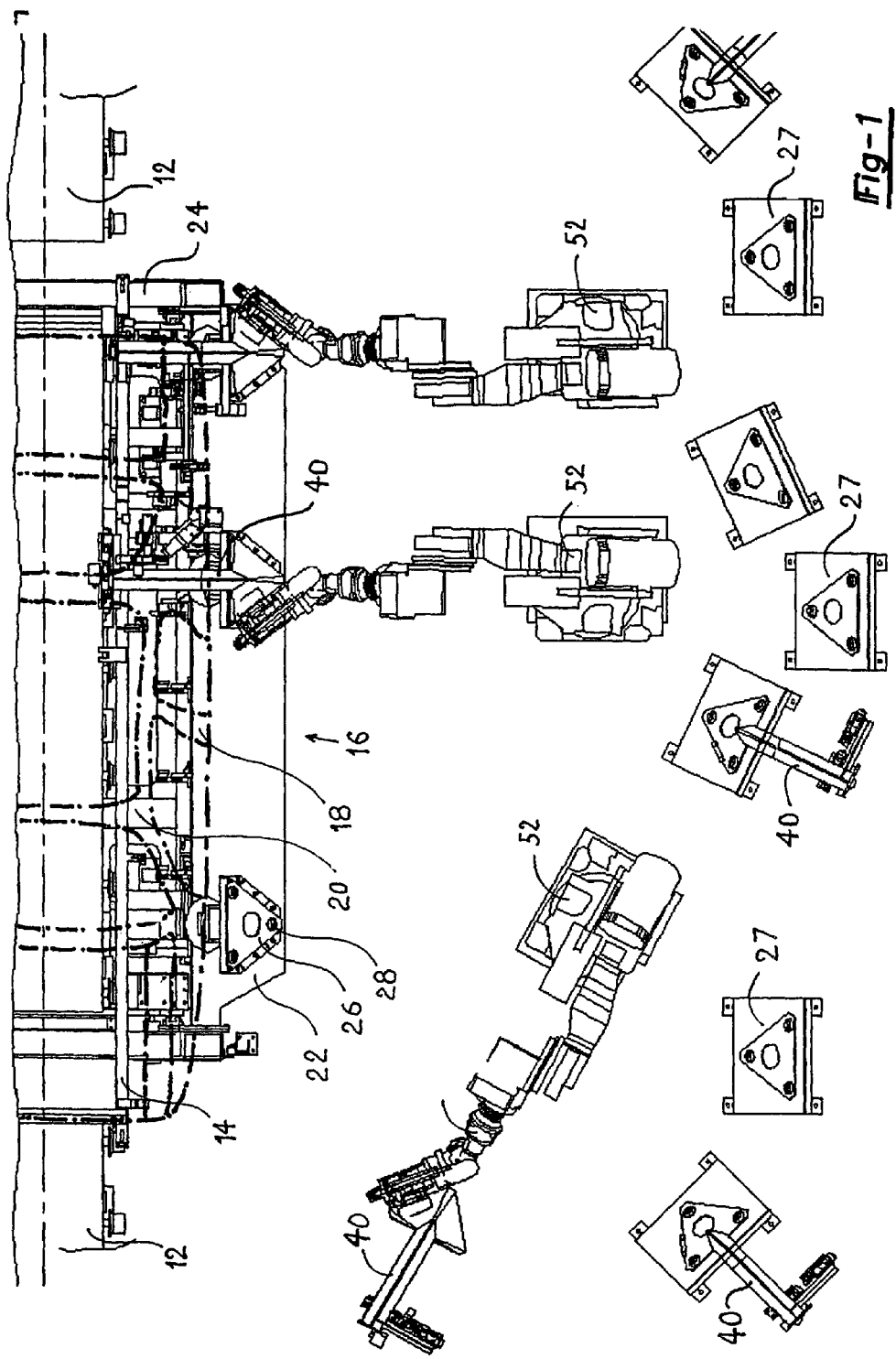
FIG. 1 is a top plan view illustrating a preferred embodiment of the present invention.

With reference first to FIG. 1, a preferred embodiment of the automotive framing system 10 of the present invention is shown for use with a manufacturing line for automotive vehicles. As used in this patent, the term "framing system" encompasses not only the vehicle frame of an automotive vehicle, but also any application where accurate positioning of two or more body components is desired. For example, such a framing system would also include fender setting, roof setting, door setting, as well as other vehicle body components than the vehicle frame. An elongated conveyor 12, illustrated only diagrammatically, sequentially conveys automotive body vehicle carriers 14 to an assembly station 16. Any conventional type of conveyor 12 may be utilized to convey the vehicle carrier 14 to the assembly station 16.

Figure 2:
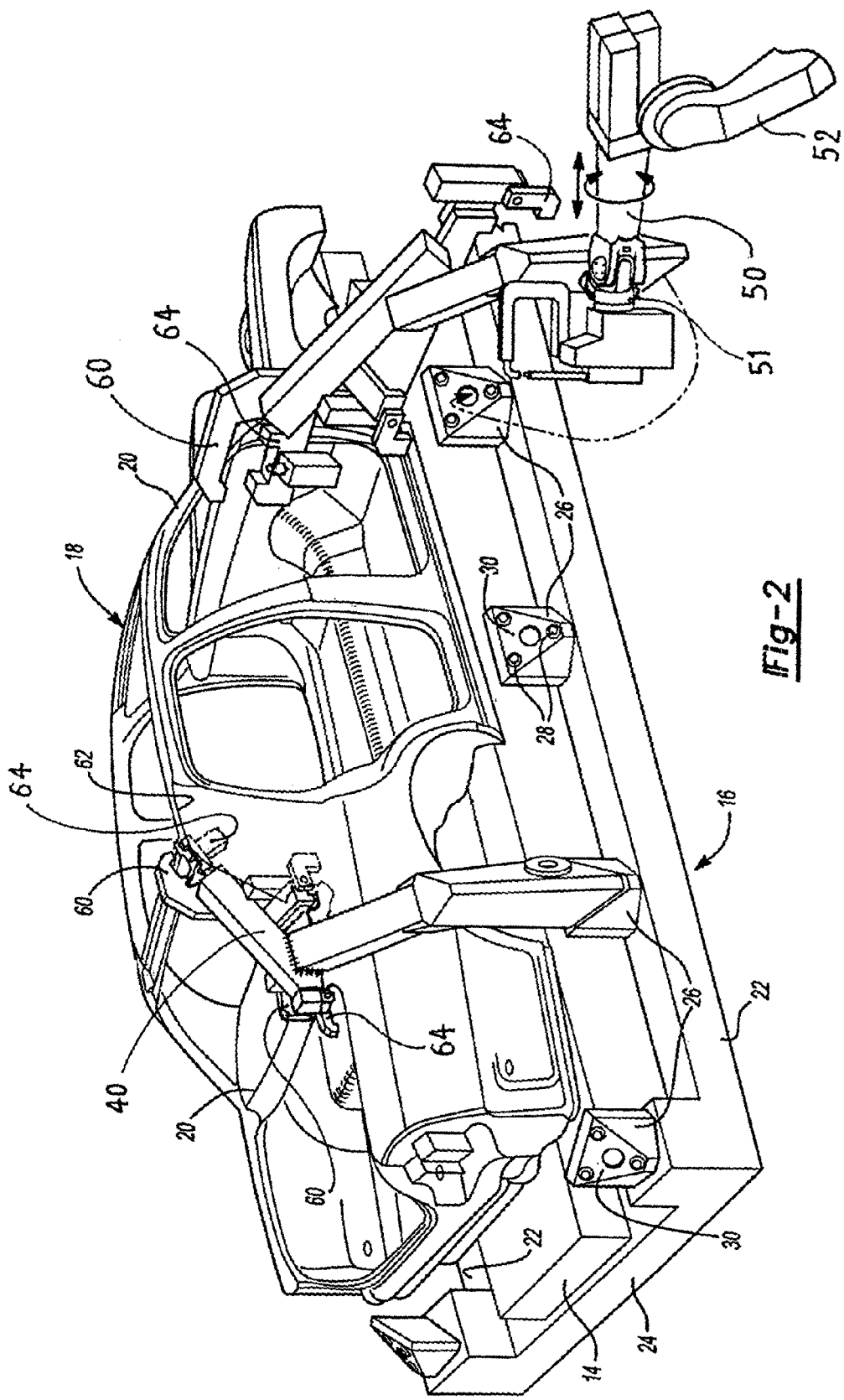
FIG. 2 is an elevational view illustrating a preferred embodiment of the present invention and with parts removed for clarity.

As best shown in FIG. 2, each vehicle body carrier 14 supports a body preassembly 18 comprising a plurality of body vehicle components 20. The body vehicle components 20 are only loosely fastened together in their approximate final assembly position by restraining tags, also known as toy tabs, or other conventional means (not shown). Furthermore, the vehicle body carrier 14 is conventionally known as a skid or a geometry pallet in the automotive industry.

With reference now particularly to FIG. 2, the assembly station 16 is shown in greater detail and comprises a pair of spaced apart frame members 22 which extend along opposite sides of the vehicle body carrier 14 and thus along opposite sides of the body preassembly 18. Preferably, crossbeams 24 extend laterally between the frame members 22 to lock the frame members 22 together in a predetermined fixed position.

Still referring to FIG. 2, at least two and preferably three or four docking stations 26 are provided along each side of the assembly station 16. Each docking station 26 is fixedly secured to the frame members 22 so that the position of each docking station 26 is fixed relative to the frame member 22 and thus relative to the assembly station 16.

Figure 3:
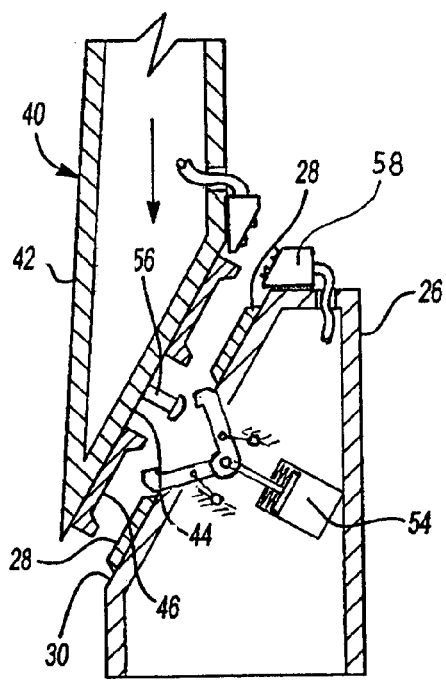
FIG. 3 is a sectional fragmentary view illustrating the docking of a tool arm with its associated docking station.

As best shown in FIGS. 2 and 3, each docking station 26 includes at least one and preferably three locator pins 28 so that each locator pin 28 is positioned at an apex of a triangular surface 30, preferably oriented at 45 degrees from the horizontal on the docking station 26. As best shown in FIG. 3, each locator pin 28 is preferably frusto-conical in shape with a preferred conicity angle of 90 degrees, and the pins 28 are fixedly secured to their associated docking stations 26.

Each docking station 26 also includes a media quick coupling 58 (FIGS. 3 and 5) which provides pressurized air and electric signals to the associated clamp arm in order to energize the framing clamps 64 as well as other air cylinder or proximity switches.

Figure 4:
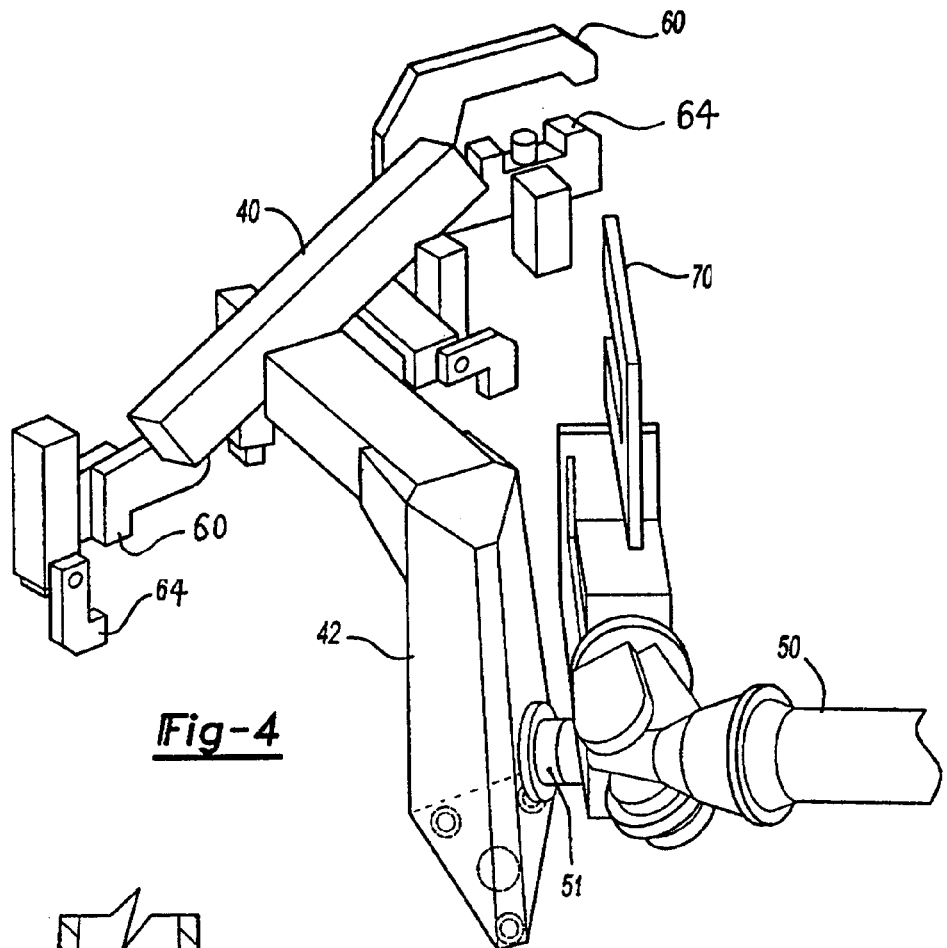
FIG. 4 is a fragmentary elevational view illustrating one tool arm and a portion of its associated robot.

With reference now particularly to FIGS. 2 and 4, the framing system further includes a plurality of tool arms 40 which, as will be shortly described, selectively clamp the vehicle body components 20 together at a predetermined position relative to each other prior to final assembly. It will be understood, of course, that the precise configuration of each tool arm 40 will vary depending upon the type of vehicle assembled at the assembly station 16. Consequently, the tool arms 40 illustrated in the drawing are for illustration purposes only.

With reference then to FIGS. 2–4, the tool arm 40 includes a main body 42 which is constructed of any rigid but light material, such as thin-walled steel, aluminum or magnesium alloy. A locating surface 44 (FIG. 3) at one end of the tool arm body 42 includes at least one and preferably three locating sockets 46. The locating sockets 46 are complementary in shape and number to the locating pins 28. Furthermore, the locating sockets 46 are positioned on the surface 44 of the tool arm 40 such that one socket 46 corresponds to and is aligned with one locating pin 28 on the docking station 26. Preferably, the shape of the tool arm main body 42 will have a tetrahedral profile, with a triangular basis matching the locating socket outer pattern.

Figure 5:
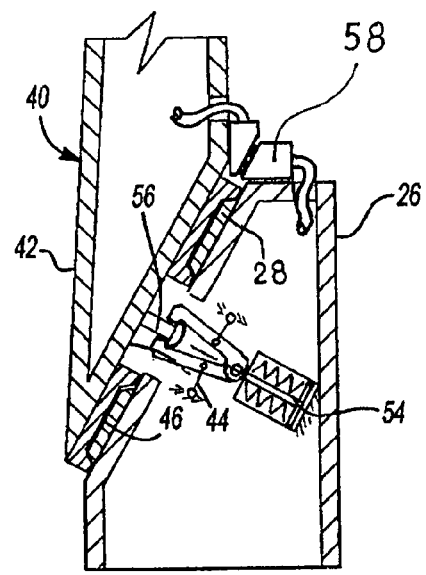
FIG. 5 is a view similar to FIG. 3, but illustrating the tool arm in a connected position with its associated docking station.

A robotic arm 50 (FIG. 4) of a robot 52 (FIG. 1) is associated with each tool arm 40. Furthermore, the robotic arm 50 is selectively secured to its associated tool arm 40 by a conventional robotic coupling 51 so that the robotic arm 50 moves its associated tool arm 40 between retracted a vehicle loading position and an assembly position. In the vehicle loading position, the robotic arm 50 moves its associated tool arm 40 laterally outwardly from the assembly station 16 to enable a new body preassembly to be moved into the assembly station. Conversely, in its assembly position, the robotic arm 50 selectively moves its associated tool arm 40 so that the reference blocks 60, e.g. locating pins, supported by the tool arm enter in contact with their matching surfaces onto the body shell, and then the locating sockets 46 engage the locating pins 28 as shown in FIG. 5. A conventional clamp assembly 54 mounted to the docking station 26 then engages a clamp pin 56 on the tool arm 40 to detachably lock the tool arm 40 to its associated docking station 26 at a predetermined and fixed position relative to the assembly station frame members 22. Thereafter, the robotic arm 50 disengages from its associated tool arm 40 by unlocking the robotic coupling 51 as shown in FIG. 6.

Referring now particularly to FIGS. 2 and 4, at least one, and more typically two or more, framing clamps 64 are secured to each tool arm 40. These framing clamps 64, once the robotic arm 50 has positioned the reference blocks 60 of its associated tool arm 40 onto the body shell, and its associated tool arm 40 on the docking station 26, engage across clamping surfaces 62 on the body components 20. Upon activation of the framing clamps 64, the framing clamps 64 secure the body components 18 against the reference block 60 at a predetermined position relative to the assembly station frame member 22 and thus relative to each other. When all of the framing clamps 64 engage their respective clamping surfaces on the body components 20, the body preassembly 18 is ready to be secured or welded together.

Figure 6:
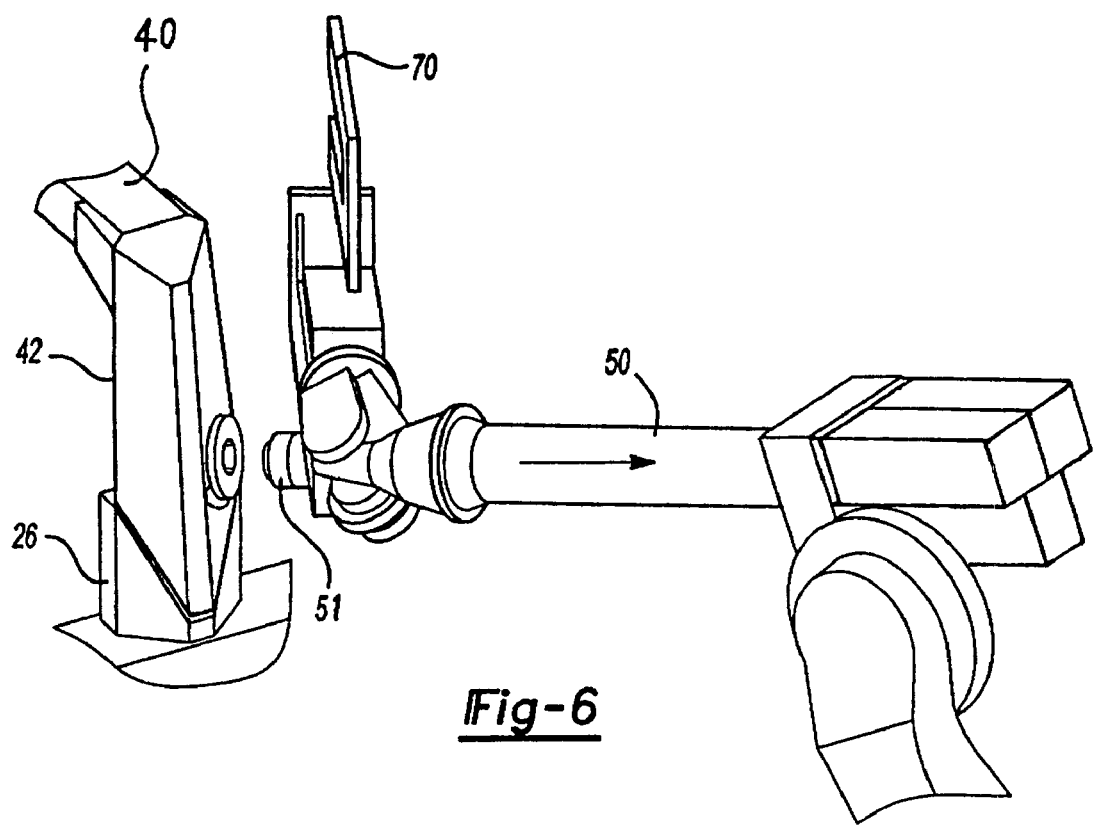
FIG. 6 is a view similar to FIG. 4, but illustrating the robotic arm disengaged from its associated tool arm.

As best shown in FIG. 6, after the robotic arm 50 has positioned its associated tool arm 40 at its associated docking station 26, and once the docking station lock 54 (FIG. 5) is engaged, the robotic arm 50 disengages from its associated tool arm body 42 by unlocking the robotic coupling 52. Thereafter, a welding gun 70 attached to the robotic arm 50 is then manipulated by the robotic arm 50 into the body preassembly 18. Upon activation of the welding gun 70, the welding gun 70 secures the body components 20 together thus completing the automotive body assembly.

It will be understood, of course, that although the body components 20 are typically secured together by welding, other types of attaching means may alternatively be used without deviation from either the scope or spirit of the present invention.

After the vehicle body components 12 have been welded or otherwise secured together by the robots 50 manipulating the welding guns 70 or other attachment means, each robotic arm 50 then reengages with its associated tool arm 40 by locking the tool arm 40 to the robotic arm 50 by the coupling 51 as shown in FIG. 4. In the meantime, all the framing clamps 64 are released. Thereafter, the tool arm clamp assembly 54 (FIG. 5) is actuated to its unlocked position thus enabling the tool arm 40 to disengage from its associated docking station 26. The framing clamps 64 are also opened, so that each robotic arm 50 is then able to move its associated tool arm 40 from the assembly position to a vehicle loading position at a position spaced laterally outwardly from the framing station 16. In the case of a new vehicle model to be framed, the robot will drop the previous tool arm 40 in its tool arm storage 27 (FIG. 1) and pick a new one suitable for the new model.

After the tool arms 40 are moved to their vehicle loading position, the now assembled automotive body is moved by the conveyor 12 out of the assembly station 16, a new vehicle carrier 14 with its body preassembly 18 is moved into the assembly station 16 and the above process is repeated.

Figure 7:
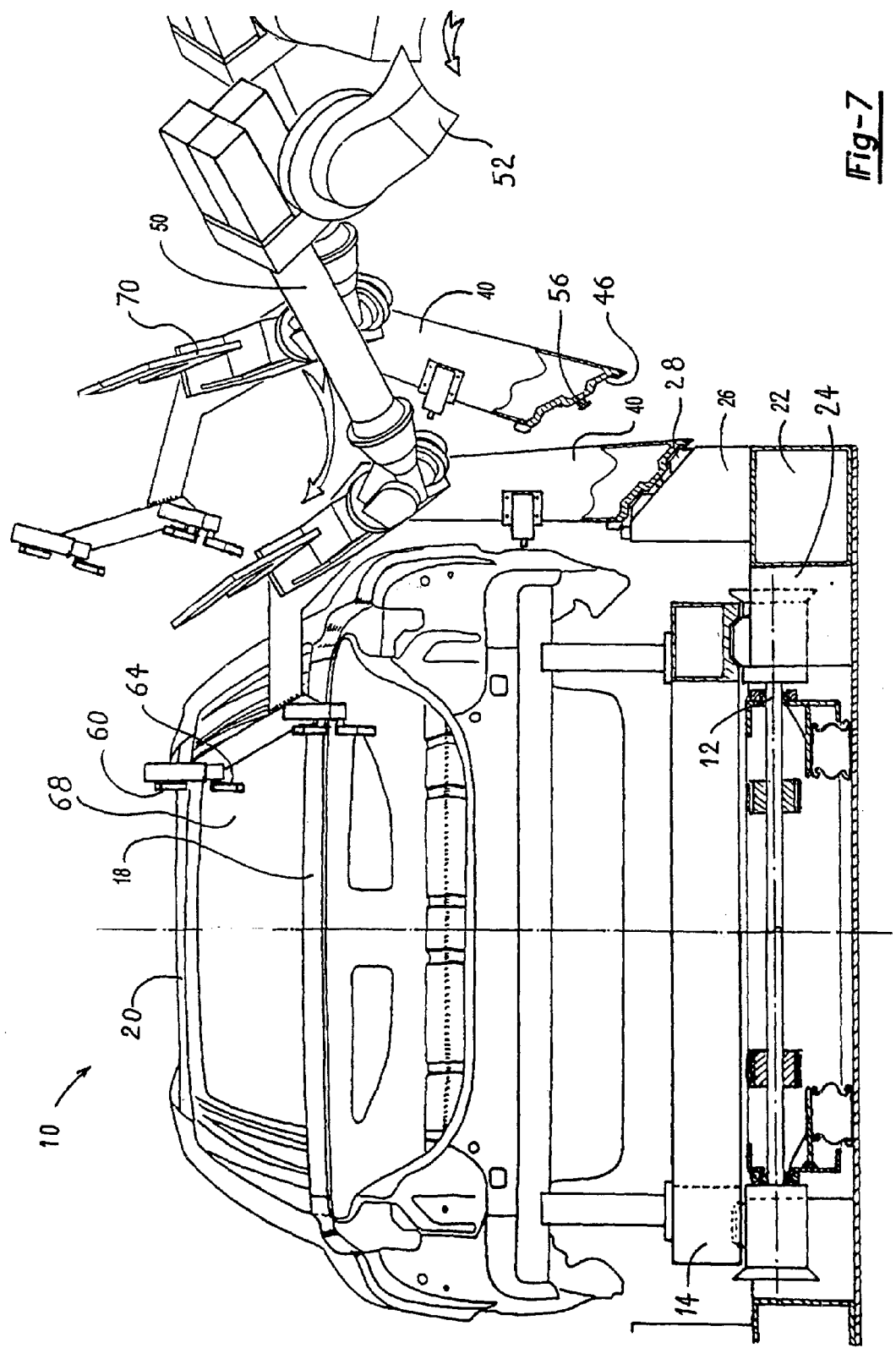
FIG. 7 is a diagrammatic end view illustrating the introduction of the tool arm in contact with the body to be framed, and its final positioning on the docking station.

With reference now to FIG. 7, an important advantage of the present invention is that each robotic arm 50 is able to manipulate portions of its associated tool arm 40 into the interior of the body preassembly 18 so that stationary reference blocks 60 are positioned closely adjacent the reference surfaces on the body components 20. For example, as shown in FIG. 7, the robotic arm 50 may be used to manipulate its associated tool arm 40 to move sections of the tool arm 40 through relatively small openings 68 of the body preassembly 18 prior to attaching the tool arm 40 to its docking station 26 as shown in solid line. This, in turn, permits inexpensive and accurate stationary reference block 60 and rapid acting clamps 64 to be used to secure the body components 20 together at their desired position prior to assembly.

A still further advantage of the present invention is that different vehicle body styles may be assembled at the same assembly station 16 and using the same robots 52. More specifically, since the robotic arms 50 of the robots 52 selectively engage and disengage from their associated tool arms 40, the robotic arms 50 may also selectively engage different tool arms 40 in order to accommodate different automotive body styles. As such, by merely selectively engaging and disengaging with different tool arms 40, different body styles may be easily accommodated and assembled at the same assembly station 16. Because of the modularity of the tool set used, if the design of two different bodies presents some commonality, such as a front block, only a fraction of the tool set can be changed to frame this different body.

Having described my invention, many modifications thereto will become apparent to those skilled in the art to which it pertains without deviation from the spirit of the invention as defined by the scope of the appended claims.

I claim:

1. A vehicle framing system for framing a vehicle body from a plurality of separate body components, at least one of the vehicle body components having a reference surface, comprising:
    an assembly station having spaced-apart frame members;
    a vehicle carrier which supports the vehicle body components in a preassembled condition at said assembly station;
    at least two docking stations secured to each frame member at predetermined positions;
    a tool arm associated with each docking station;
    a robot associated with each tool arm for moving said tool arm between an assembly position in which each said tool arm abuts against its associated docking station at a predetermined position, and a vehicle loading position in which each tool arm is disengaged from its associated docking station;
    a tool arm clamp mounted to each docking station which clamps said tool arm to its associated docking station at said predetermined position when said tool arm is in said assembly position, said tool arm clamp forming the sole means for removably securing each said tool arm to its associated docking station; and
    a framing clamp having a reference block secured to each tool arm and movable between a clamped and an unclamped position, wherein said clamped position of each framing clamp maintains its reference block in contact with the at least one reference surface on the vehicle body component to thereby maintain said vehicle body components at a predetermined position relative to each other.

2. The invention as defined in claim 1 and comprising means for selectively detachably connecting each robot with its associated tool arm.

3. The invention as defined in claim 1 and comprising a welding gun connected to at least one of said robots.

4. The invention as defined in claim 3 wherein the welding robots are sized to carry and dynamically move their associated tool arms without having to disconnect from their welding guns.

5. The invention as defined in claim 1 wherein, with said tool arms at their respective assembly positions, at least a portion of at least one tool arm extends into an interior of the vehicle body components.

6. The invention as defined in claim 1 wherein each docking station includes three spaced locator pins, each locator pin having a predefined locating surface, and wherein each tool arm includes three locator sockets, each tool arm locator socket having a locating surface complementary to and aligned with said docking station locating pins.

7. The invention as defined in claim 6 wherein said docking station locator pins are frusto-conical in shape.

8. The invention as defined in claim 6 wherein said docking station locator pins are positioned at the apices of a triangle.

9. The invention as defined in claim 8 wherein said locator pins are in a plan preferably oriented at 45 degrees from the horizontal.

10. The invention as defined in claim 8 wherein said tool arm clamp is aligned with the centroid of said triangle.

11. The invention as defined in claim 10 wherein said tool arm clamp remains clamped in case of power outage (type activate for release).

12. The invention as defined in claim 6 wherein frusto-conical locator pins have a preferred conicity angle of 90 degrees.

13. The invention as defined in claim 6 and comprising a media quick connector for pressurized air and electric communication in between the docking station and tool arm, said media being used to activate and control said inboard framing clamp and locating pin cylinder.

14. The invention as defined in claim 1 wherein the tool arm main body has a tetrahedral shape with a triangular basis matching the pattern of the locating socket outer perimeter.

15. The invention as defined in claim 1 and comprising a conveyor which moves said vehicle carrier to said framing station.

16. The invention as defined in claim 1 wherein said robot includes a coupler which selectively engages its associated tool arm.

* * * * *